T. BURGESS.
HARNESS HOOK.
APPLICATION FILED JUNE 3, 1920.

1,350,778. Patented Aug. 24, 1920.

Inventor
Tom Burgess,
by Chas. Williamson
Atty

UNITED STATES PATENT OFFICE.

TOM BURGESS, OF CORINTH, MISSISSIPPI.

HARNESS-HOOK.

1,350,778.  Specification of Letters Patent.  Patented Aug. 24, 1920.

Application filed June 3, 1920.  Serial No. 386,173.

*To all whom it may concern:*

Be it known that I, TOM BURGESS, citizen of the United States, residing at Corinth, in the county of Alcorn and State of Mississippi, have invented certain new and useful Improvement in Harness-Hooks, of which the following is a specification, reference being had therein to the accompanying drawing.

My invention relates to hooks, such, for example, as swingletree hooks, and my object is to provide in an inexpensive form a simple, strong, and efficient hook for such purpose or for any use to which it may be adapted and my invention consists in the hook having the structure defined by or embraced within the language of the appended claim.

In the annexed drawings—

Figure 1:
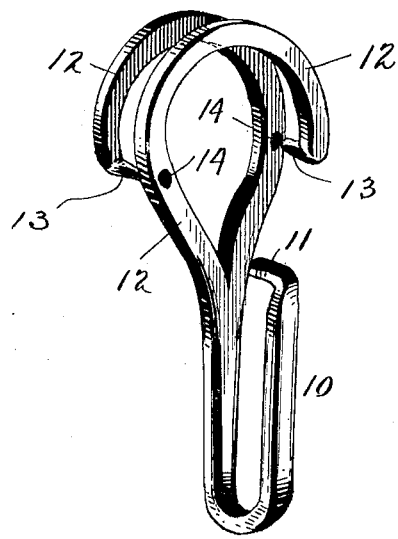
Figure 2:
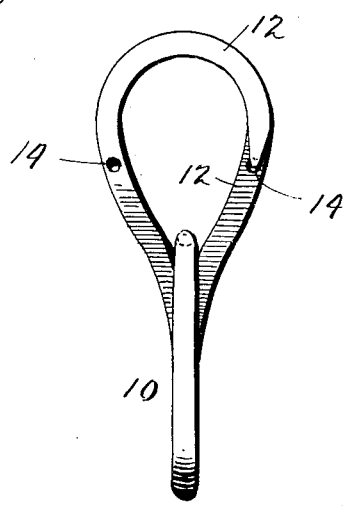

Figure 1 is a perspective view of a hook embodying my invention; and Fig. 2 is an elevation thereof.

My device consists in a single member of the eye and the hook proper, the hook 10 being of usual form with its extremity 11 bent inward toward the body of the device. The eye is formed by splitting the bar from which the device is formed into two branches 12 that are curved in opposite directions through less than a circle and terminating each branch in a stud 13 that is bent at right angles toward the opposite branch, the latter opposite the stud having a hole 14 of a size to receive the stud, into which the stud enters when the two curved portions of the branch are pressed together, thus producing a completely closing eye. The ends of the stud when forced into said openings may be headed or riveted down to securely unite the parts.

What I claim is:

A device of the kind described comprising in a single piece a hook and an eye, the eye consisting of similar oppositely curved branches with a terminal stud opposite which is a hole, each branch being less than a circle and the stud of one branch being receivable in the hole opposite it in the other branch and the member from which the branches extend being a single piece that terminates in the hook and the two branches being bendable one toward the other to cause the stud at one branch to enter the hole in the opposite branch.

In testimony whereof I hereunto affix my signature.

TOM BURGESS.